United States Patent
Jiang et al.

(10) Patent No.: US 12,450,688 B2
(45) Date of Patent: Oct. 21, 2025

(54) GAZE CORRECTION METHOD AND APPARATUS FOR FACE IMAGE, DEVICE, COMPUTER-READABLE STORAGE MEDIUM, AND COMPUTER PROGRAM PRODUCT FACE IMAGE

(71) Applicant: Tencent Technology (Shenzhen) Company Limited, Guangdong (CN)

(72) Inventors: Zhengkai Jiang, Shenzhen (CN); Jinlong Peng, Shenzhen (CN); Keke He, Shenzhen (CN); Xiaoming Yu, Shenzhen (CN); Yang Yi, Shenzhen (CN); Juanhui Tu, Shenzhen (CN); Yi Zhou, Shenzhen (CN); Chenghao Liu, Shenzhen (CN); Yabiao Wang, Shenzhen (CN); Ying Tai, Shenzhen (CN); Chengjie Wang, Shenzhen (CN); Jilin Li, Shenzhen (CN); Feiyue Huang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 438 days.

(21) Appl. No.: 17/977,576

(22) Filed: Oct. 31, 2022

(65) Prior Publication Data
US 2023/0072627 A1    Mar. 9, 2023

Related U.S. Application Data

(63) Continuation of application No. PCT/CN2022/072302, filed on Jan. 17, 2022.

(30) Foreign Application Priority Data

Jan. 22, 2021 (CN) .......................... 202110088340.4

(51) Int. Cl.
*G06V 40/16* (2022.01)
*G06T 3/20* (2006.01)
*G06T 7/20* (2017.01)

(52) U.S. Cl.
CPC .................. *G06T 3/20* (2013.01); *G06T 7/20* (2013.01); *G06V 40/171* (2022.01); *G06T 2207/20081* (2013.01); *G06T 2207/30201* (2013.01)

(58) Field of Classification Search
CPC ............ G06T 2207/30201; G06T 5/77; G06T 2207/20164; G06T 11/00; G06T 17/20;
(Continued)

(56) References Cited

U.S. PATENT DOCUMENTS

| | | | |
|---|---|---|---|
| 2004/0114829 A1* | 6/2004 | LeFeuvre | G06T 5/77 382/275 |
| 2019/0110003 A1* | 4/2019 | Lai | G06F 3/013 |
| 2021/0312635 A1* | 10/2021 | Price | G06T 7/194 |

FOREIGN PATENT DOCUMENTS

| | | | | |
|---|---|---|---|---|
| CN | 110740246 A | | 1/2020 | |
| CN | 111008929 A | * | 4/2020 | ........... G06T 3/0012 |

(Continued)

OTHER PUBLICATIONS

Zhang Mingli, "Research on face key point detection algorithm," North China University of Technology, Master's Electronic Journal, Dec. 15, 2018, pp. 47-51, Chapter 6.

(Continued)

*Primary Examiner* — Quan M Hua
(74) *Attorney, Agent, or Firm* — Sughrue Mion, PLLC

(57) ABSTRACT

In the field of artificial intelligence technologies, a gaze correction method and apparatus for a face image, a device, a computer-readable storage medium, and a computer program product are provided. The method includes: acquiring (Continued)

an eye image from a face image; determining an eye movement flow field based on the eye image and a target gaze direction, the target gaze direction being a gaze direction to which an eye gaze in the eye image is to be corrected; adjusting a pixel position in the eye image based on the eye movement flow field, to obtain a corrected eye image; and generating a face image with a corrected gaze based on the corrected eye image.

18 Claims, 8 Drawing Sheets

(58) Field of Classification Search
CPC ... G06T 17/205; G06T 19/20; G06T 2200/24; G06T 2207/10016; G06T 2207/10028; G06T 2207/20084; G06T 2207/20116; G06T 2219/2021; G06T 7/11; G06T 7/149; G06T 7/75; G06T 7/579; G06T 7/564; G06T 7/337; G06T 7/251; G06T 2207/10024; G06T 7/13; G06T 7/0002; G06T 2207/30252; G06T 2207/20104; G06T 2207/20081; G06T 2207/10004; G06T 2207/20012; G06V 40/171; G06V 10/25; G06V 10/44; G06V 10/30; G06V 20/56; G06V 40/162; G06V 40/178; G06V 40/193; G06N 3/04
See application file for complete search history.

(56) References Cited

FOREIGN PATENT DOCUMENTS

| CN | 111031234 A | 4/2020 |
|---|---|---|
| CN | 111339928 A | 6/2020 |
| CN | 109040521 B | 11/2020 |
| CN | 112733794 A | 4/2021 |
| CN | 112733795 A | 4/2021 |
| CN | 112733797 A | 4/2021 |
| JP | 2008-264341 A | 11/2008 |

OTHER PUBLICATIONS

"Study of Image Stitching Techniques Based on Point Features and Mutual Information," Chinese Doctoral Dissertations & Master's Theses Full-Text Database (Master), Information Science and Technology, Apr. 15, 2018, pp. 19-21, Chapter 2.
Chinese Office Action for 202110088340.4 dated Jun. 7, 2022.
International Search Report for PCT/CN2022/072302 dated Mar. 25, 2022.
Written Opinion for PCT/CN2022/072302 dated Mar. 25, 2022.

* cited by examiner

GAZE CORRECTION METHOD AND APPARATUS FOR FACE IMAGE, DEVICE, COMPUTER-READABLE STORAGE MEDIUM, AND COMPUTER PROGRAM PRODUCT FACE IMAGE

CROSS-REFERENCE TO RELATED APPLICATION(S)

This application is a continuation application of International Application No. PCT/CN2022/072302, filed Jan. 17, 2022, which claims priority to Chinese Patent Application No. 202110088340.4, filed on Jan. 22, 2021, the disclosures of which are herein incorporated by reference in their entireties.

FIELD

The disclosure relates to the field of artificial intelligence technologies, and in particular, to a gaze correction method and apparatus for a face image, a device, a computer-readable storage medium, and a computer program product.

BACKGROUND

Gaze correction on an object (for example, a person, an animal, or the like) in an image is an application of artificial intelligence in graphics and image processing, and has a variety of application scenarios. The gaze correction is configured to correct the gaze of the object in the image to any specified direction.

In the related art, a method of performing gaze correction based on a fixed head posture is provided. This method only applies to an image with a fixed head posture. However, for scenarios such as a video conference and a video call, a head posture of a user changes in real time, causing the method to be inapplicable to such scenarios.

SUMMARY

Embodiments of the disclosure provide a gaze correction method and apparatus for a face image, a device, a computer-readable storage medium, and a computer program product. The technical solutions are as follows.

An aspect of an example embodiment of the disclosure provides a gaze correction method. The method includes:
acquiring an eye image from a face image;
determining an eye movement flow field based on the eye image and a target gaze direction, the target gaze direction being a gaze direction to which an eye gaze in the eye image is to be corrected;
adjusting a pixel position in the eye image based on the eye movement flow field, to obtain a corrected eye image; and
generating a face image with a corrected gaze based on the corrected eye image.

An aspect of an example embodiment of the disclosure provides a method for training a gaze correction model. The method includes:
training a movement-flow-field-based first teacher gaze correction model by using an eye image sample, to obtain a trained first teacher gaze correction model, the trained first teacher gaze correction model being configured to output an eye movement flow field of the eye image sample, wherein a pixel position in the eye image sample is to be adjusted based on the eye movement flow field;
training an image-based second teacher gaze correction model by using the eye image sample, to obtain a trained second teacher gaze correction model, the trained second teacher gaze correction model being configured to output a corrected eye image sample of the eye image sample; and
performing knowledge distillation training on a student gaze correction model by using the trained first teacher gaze correction model and the trained second teacher gaze correction model, to obtain a trained student gaze correction model.

An aspect of an example embodiment of the disclosure provides a gaze correction apparatus for a face image. The apparatus includes:
at least one memory configured to store program code; and
at least one processor configured to read the program code and operate as instructed by the program code, the program code including:
eye image acquisition code configured to cause the at least one processor to acquire an eye image from a face image;
movement flow field generation code configured to cause the at least one processor to determine an eye movement flow field based on the eye image and a target gaze direction, the target gaze direction being a gaze direction to which an eye gaze in the eye image is to be corrected, and the eye movement flow field being configured to adjust a pixel position in the eye image;
gaze correction code configured to cause the at least one processor to perform gaze correction on the eye image based on the eye movement flow field, to obtain a corrected eye image; and
eye image ensembling code configured to cause the at least one processor to generate a face image with a corrected gaze based on the corrected eye image.

An aspect of an example embodiment of the disclosure provides an apparatus for training a gaze correction model. The apparatus includes:
at least one memory configured to store program code; and
at least one processor configured to read the program code and operate as instructed by the program code, the program code including:
first teacher model training code configured to cause the at least one processor to train a movement-flow-field-based first teacher gaze correction model through a to-be-corrected eye image sample, to obtain a trained first teacher gaze correction model, the trained first teacher gaze correction model being configured to output an eye movement flow field of the to-be-corrected eye image sample, the eye movement flow field being configured to adjust a pixel position in the to-be-corrected eye image sample;
a second teacher model training code configured to cause the at least one processor to train an image-based second teacher gaze correction model through the to-be-corrected eye image sample, to obtain a trained second teacher gaze correction model, the trained second teacher gaze correction model being configured to output a corrected eye image sample of the to-be-corrected eye image sample; and
a student model training code configured to cause the at least one processor to perform knowledge distillation training on the student gaze correction model through the trained first teacher gaze correction model and the trained second teacher gaze correction model, to obtain a trained student gaze correction model.

An aspect of an example embodiment of the disclosure provides a computer device, including a processor and a memory, the memory storing at least one instruction, at least one program, a code set, or an instruction set, the at least one instruction, the at least one program, the code set, or the instruction set being loaded and executed by the processor to implement the gaze correction method for a face image, or the method for training a gaze correction model.

An aspect of an example embodiment of the disclosure provides a non-transitory computer-readable storage medium, storing at least one instruction, at least one program, a code set, or an instruction set, the at least one instruction, the at least one program, the code set, or the instruction set being loaded and executed by a processor to implement the gaze correction method for a face image, or the method for training a gaze correction model.

An aspect of an example embodiment of the disclosure provides a computer program product or a computer program. The computer program product or the computer program includes computer instructions, and the computer instructions are stored in a non-transitory computer-readable storage medium. A processor of a computer device reads the computer instructions from the computer-readable storage medium, and executes the computer instructions, causing the computer device to perform the gaze correction method for a face image, or the method for training a gaze correction model.

BRIEF DESCRIPTION OF THE DRAWINGS

To describe the technical solutions of the embodiments of the disclosure more clearly, the following briefly introduces the accompanying drawings required for describing the embodiments. Apparently, the accompanying drawings in the following description show only some embodiments of the disclosure, and a person of ordinary skill in the art may still derive other accompanying drawings from these accompanying drawings without creative efforts.

DETAILED DESCRIPTION

Figure 1:
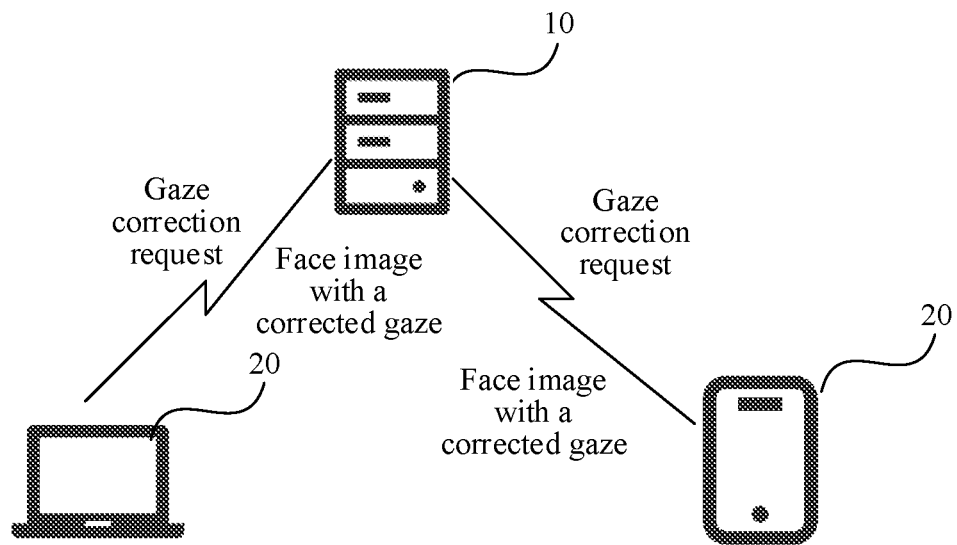
FIG. 1 is a schematic diagram of a solution implementation environment according to an embodiment of the disclosure.

To make objectives, technical solutions, and advantages of the disclosure clearer, the following further describes in detail implementations of the disclosure with reference to the accompanying drawings.

Artificial intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology in computer science. This technology attempts to understand the essence of intelligence and produce a new intelligent machine that may react in a manner similar to human intelligence. AI is to study the design principles and implementation methods of various intelligent machines, so that the machines may perceive, infer, and make decisions.

The AI technology is a comprehensive subject, relating to a wide range of fields, and involving both hardware and software techniques. Basic AI technologies generally include technologies such as a sensor, a dedicated AI chip, cloud computing, distributed storage, a big data processing technology, an operating/interaction system, and electromechanical integration. An AI software technology mainly includes several major fields such as a computer vision (CV) technology, a speech processing technology, a natural language processing technology, and machine learning/deep learning (DL).

The CV technology is a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. As a scientific discipline, the CV studies related theories and technologies and attempts to establish an AI system that may obtain information from images or multidimensional data. The CV technology generally includes technologies such as image processing, image recognition, image semantic understanding (ISU), image retrieval, optical character recognition (OCR), video processing, video semantic understanding, video content/behavior recognition, three-dimensional object reconstruction, a three-dimensional (3D) technology, virtual reality, augmented reality, synchronous positioning, and map construction, and further includes biological feature recognition technologies such as common face recognition and fingerprint recognition.

ML is a multi-field interdiscipline, and relates to a plurality of disciplines such as the probability theory, statistics, the approximation theory, convex analysis, and the algorithm complexity theory. ML specializes in studying how a computer simulates or implements a human learning behavior to acquire new knowledge or skills, and reorganize an existing knowledge structure, so as to keep improving its performance. ML is a core of AI, is a fundamental way to make the computer intelligent, and is applied to various fields of AI. ML and DL generally include technologies such as an artificial neural network, a belief network, reinforcement learning, transfer learning, inductive learning, and learning from demonstrations.

The technical solutions provided in the embodiments of the disclosure relate to technologies such as ML and CV of AI, and are illustratively described by using the following embodiments.

FIG. 1 is a schematic diagram of a solution implementation environment according to an embodiment of the disclosure. The solution implementation environment may be implemented as a video conference system. The solution implementation environment may include a server 10 and a plurality of terminals 20.

The terminal 20 may be an electronic device such as a mobile phone, a tablet computer, a personal computer (PC), a smart television, a multimedia playback device, or the like. A client that runs a video conference application may be installed in the terminal 20, so as to provide a user with a video conference function.

The server 10 may be one server, a server cluster including a plurality of servers, or a cloud computing service center. The server 10 may be a back-end server of the video conference application configured to provide back-end services for the client.

The terminal 20 may communicate with the server 10 by using a network.

In the embodiment of the disclosure, the client that runs the video conference application may be installed in the terminal 20. The client of the video conference application may collect a face image in a video process, generate a gaze correction request based on the face image, and submit the gaze correction request to the server, so as to implement a gaze correction method for a face image provided in the embodiment of the disclosure when executable instructions in a storage medium of the server 200 are executed by a processor. The method includes: acquiring a to-be-corrected eye image from the face image; determining an eye movement flow field based on the to-be-corrected eye image and a target gaze direction; performing gaze correction on the to-be-corrected eye image based on the eye movement flow field, to obtain a corrected eye image; and generating a face image with a corrected gaze based on the corrected eye image, and transmitting the face image with a corrected gaze to the terminal 20. The eye movement flow field in the embodiment of the disclosure may be obtained by invoking a student gaze correction model. Before the student gaze correction model is invoked, the student gaze correction model may be trained, including the followings:

training a movement-flow-field-based first teacher gaze correction model by using a to-be-corrected eye image sample, to obtain a trained first teacher gaze correction model, the trained first teacher gaze correction model being configured to output an eye movement flow field of the to-be-corrected eye image sample; training an image-based second teacher gaze correction model by using the to-be-corrected eye image sample, to obtain a trained second teacher gaze correction model, the trained second teacher gaze correction model being configured to output a corrected eye image sample of the to-be-corrected eye image sample; and performing knowledge distillation training on the student gaze correction model by using the trained first teacher gaze correction model and the trained second teacher gaze correction model, to obtain a trained student gaze correction model.

Figure 2:
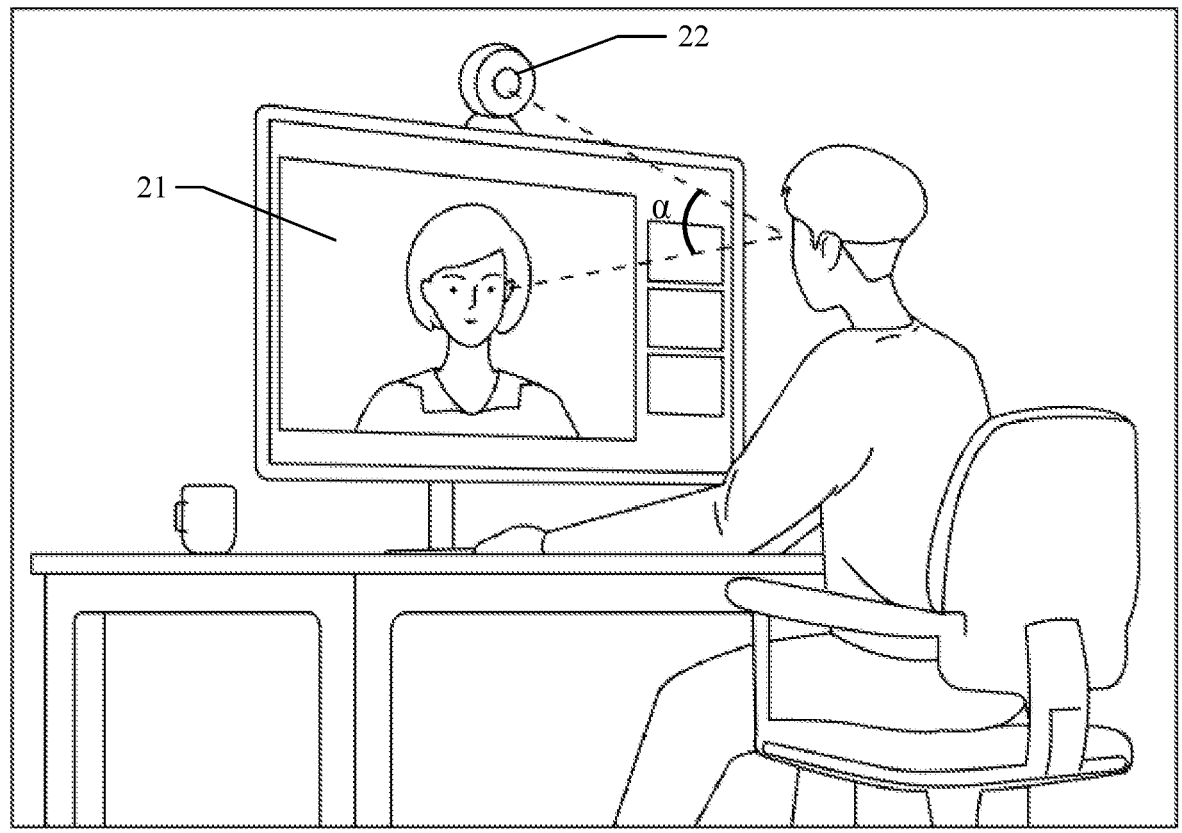
FIG. 2 is a schematic diagram of an included angle formed by a camera, an eye, and a position at which the eye is directed in a video conference scenario.

As shown in FIG. 2, in a video conference scenario, a user generally gazes at another participant in a screen 21, and a camera 22 is not in the screen 21, but at other positions (e.g., above the screen 21 in FIG. 2). Therefore, an included angle is often formed by the camera 22, human eyes, and a position at which the human eyes look (an included angle α shown by dashed lines in FIG. 2). In the eyes of the other person, the user does not gaze at another participant, but gazes toward the another participant, which affects communication experience of the user.

In addition to the video conference scenario, similar problems exist in scenarios such as a video call, a live video, social sharing, and the like. For example, in the scenario of social sharing, the gaze correction method for the face image provided in the embodiments of the disclosure provides an editing function for gaze changing, to support the user for correction of the gaze of objects in the image and the video. For example, with respect to a direction 'a' of gaze of the user in an original image, by using the gaze correction method for a face image provided in the embodiment of the disclosure, the gaze is corrected to a direction 'b', thereby realizing the editing function for gaze changing, so that the image conveys gaze information different from that in the original image (that is, corrected gaze information).

In addition, in the foregoing scenarios, a head posture of the user changes in real time, which makes it inapplicable to apply a gaze correction method based on a fixed head posture provided in the related art. In the technical solution provided in the embodiment of the disclosure, an eye movement flow field is generated by combining the to-be-corrected eye image and the target gaze direction to which the eye gaze is to be corrected, and then the gaze correction is performed on the to-be-corrected eye image by using the eye movement flow field to generate the corrected eye image. Since the head posture is not required to be fixed for the gaze correction, the embodiment of the disclosure has a better gaze correction capability for scenarios such as the video conference, the video call, and the live video where the head posture of the user changes in real time.

In the embodiment of the disclosure, the client that runs the video conference application may be installed in the terminal 20. The client of the video conference application may collect a face image in a video process, and generate a gaze correction request based on the face image, so as to implement the gaze correction method for a face image provided in the embodiment of the disclosure when executable instructions in a storage medium of the terminal 20 are executed by a processor. The method includes: acquiring a to-be-corrected eye image from a face image; determining an eye movement flow field based on the to-be-corrected eye image and a target gaze direction; performing gaze correction on the to-be-corrected eye image based on the eye movement flow field, to obtain a corrected eye image; and generating a face image with a corrected gaze based on the corrected eye image. The eye movement flow field in the embodiment of the disclosure may be obtained by invoking a student gaze correction model. Before the student gaze correction model is used, the student gaze correction model may be trained, including:

training a movement-flow-field-based first teacher gaze correction model by using a to-be-corrected eye image sample, to obtain a trained first teacher gaze correction model, the trained first teacher gaze correction model being configured to output an eye movement flow field of the to-be-corrected eye image sample; training an image-based second teacher gaze correction model by using the to-be-corrected eye image sample, to obtain a trained second teacher gaze correction model, the trained second teacher gaze correction model being configured to output a corrected eye image sample of the to-be-corrected eye image sample; and performing knowledge distillation training on the student gaze correction model by using the trained first teacher gaze correction model and the trained second teacher gaze correction model, to obtain a trained student gaze correction model.

Figure 3:
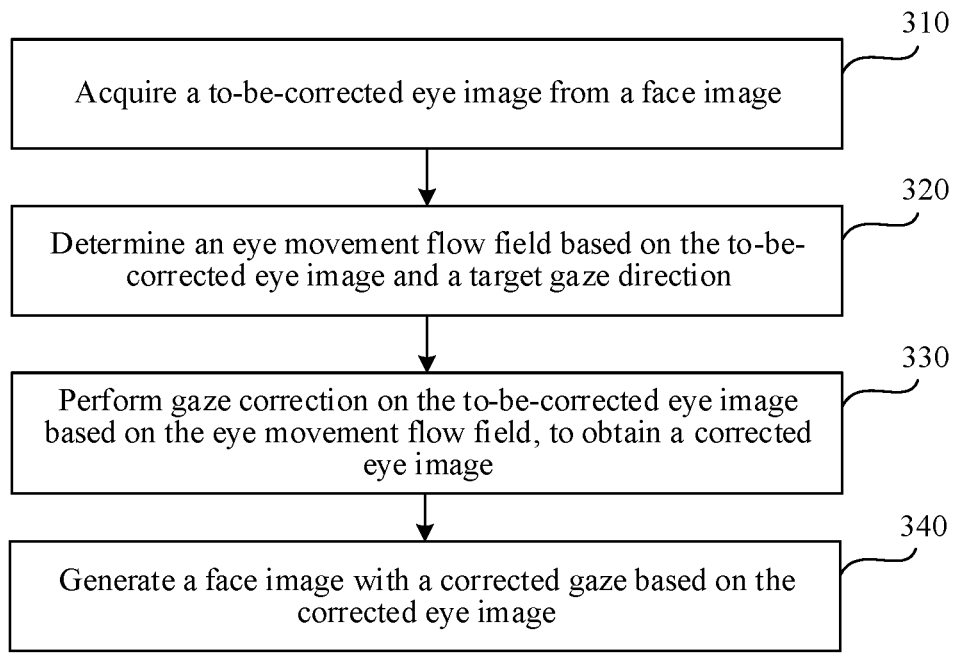
FIG. 3 is a flowchart of a gaze correction method for a face image according to an embodiment of the disclosure.

FIG. 3 is a flowchart of a gaze correction method for a face image according to an embodiment of the disclosure. Steps of the method may be performed by a terminal device such as a mobile phone, a tablet computer, a PC, and the like, or may be performed by a server. The method may include the following steps (310-340).

Step 310: Acquire a to-be-corrected eye image from a face image.

For example, the face image is an image including a face. The face image may be a photo or a picture, or an image frame in a video, which is not limited in the embodiment of the disclosure. A screenshot of the to-be-corrected eye image is taken from the face image, and includes an image of an eye region on which gaze correction is to be performed.

It should be noted that one face image includes a left eye and a right eye (for example, human eyes). Therefore, two to-be-corrected eye images may be acquired from the face image. One corresponds to the to-be-corrected eye image of the left eye, and the other corresponds to the to-be-corrected eye image of the right eye. In an embodiment, a to-be-corrected eye image may alternatively include two eyes: a left eye and a right eye.

Step 320: Determine an eye movement flow field based on the to-be-corrected eye image and a target gaze direction.

For example, the target gaze direction is a gaze direction to which an eye gaze in the to-be-corrected eye image is to be corrected (that is, the gaze of the eyes is corrected to a specified direction). For example, the target gaze direction is a direction facing a camera, so that the eye gaze in the to-be-corrected eye image is corrected to the direction facing the camera. For example, the target gaze direction includes a pitch angle and a yaw angle. For example, in the case of facing the camera, the pitch angle is defined to be equal to 0°, and the yaw angle is also defined to be equal to 0°.

The eye movement flow field is used to adjust a pixel position in the to-be-corrected eye image. A pixel value of each pixel in the eye movement flow field includes a horizontal displacement and a vertical displacement. The horizontal displacement of a pixel in the eye movement flow field represents a displacement in a horizontal direction of a pixel in the to-be-corrected eye image at a same position as the pixel, such as a quantity of pixels displaced in the horizontal direction. The vertical displacement of a pixel in the eye movement flow field represents a displacement in a vertical direction of a pixel in the to-be-corrected eye image at a same position as the pixel, such as a quantity of pixels displaced in the vertical direction. The eye movement flow field may include a two-dimensional image, such as a first dimension image and a second dimension image. The first dimension image is configured to store the horizontal displacement of each pixel, and the second dimension image is configured to store the vertical displacement of each pixel. Dimensions (including a height and a width) of the first dimension image and the second dimension image are the same as dimensions of the to-be-corrected eye image.

Step 330: Perform gaze correction on the to-be-corrected eye image based on the eye movement flow field, to obtain a corrected eye image.

For example, for any pixel in the to-be-corrected eye image, a horizontal displacement and a vertical displacement of the pixel are acquired from the eye movement flow field, and then the pixel is displaced based on the horizontal displacement and the vertical displacement to obtain a corrected eye image.

Step 340: Generate a face image with a corrected gaze based on the corrected eye image.

The corrected eye image is ensembled to a corresponding position in an original face image, and the corrected eye image is used to cover or replace the foregoing to-be-corrected eye image, to obtain the face image with a corrected gaze.

Figure 4A:
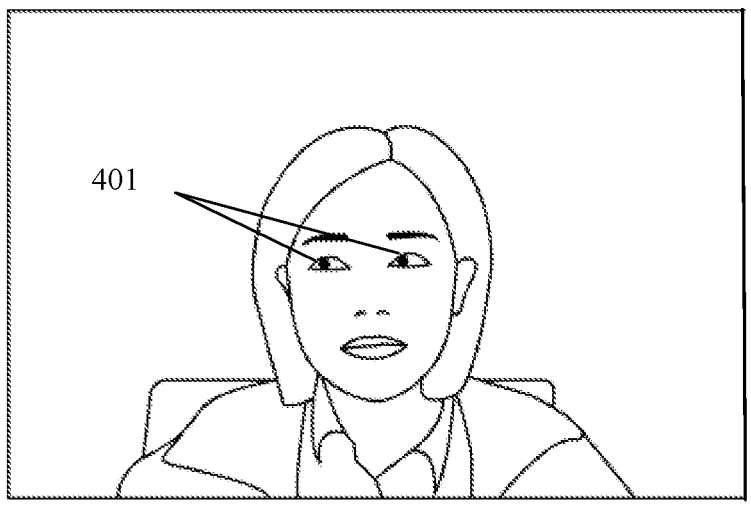
FIG. 4A is a schematic diagram before gaze correction according to an embodiment of the disclosure.
Figure 4B:
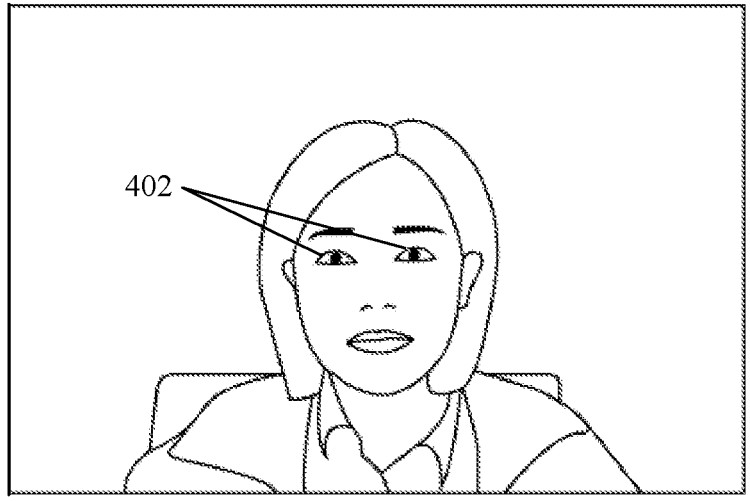
FIG. 4B is a schematic diagram after gaze correction according to an embodiment of the disclosure.

FIG. 4A and FIG. 4B show a gaze correction method according to an embodiment of the disclosure. In the comparison diagram before and after the gaze correction, FIG. 4A shows a face image before gaze correction, and gazes of human eyes 401 are offset. FIG. 4B shows a face image with a corrected gaze, and gazes of human eyes 402 are focused on the front.

Based on the above, in the technical solution provided in the embodiment of the disclosure, the eye movement flow field is generated by combining the to-be-corrected eye image and the target gaze direction to which the eye gaze is to be corrected, and then the gaze correction is performed on the to-be-corrected eye image by using the eye movement flow field to obtain the corrected eye image. Since the head posture is not required to be fixed for the gaze correction, the embodiment of the disclosure has a better gaze correction capability for scenarios such as the video conference, the video call, and the live video where the head posture of the user changes in real time.

Figure 5:
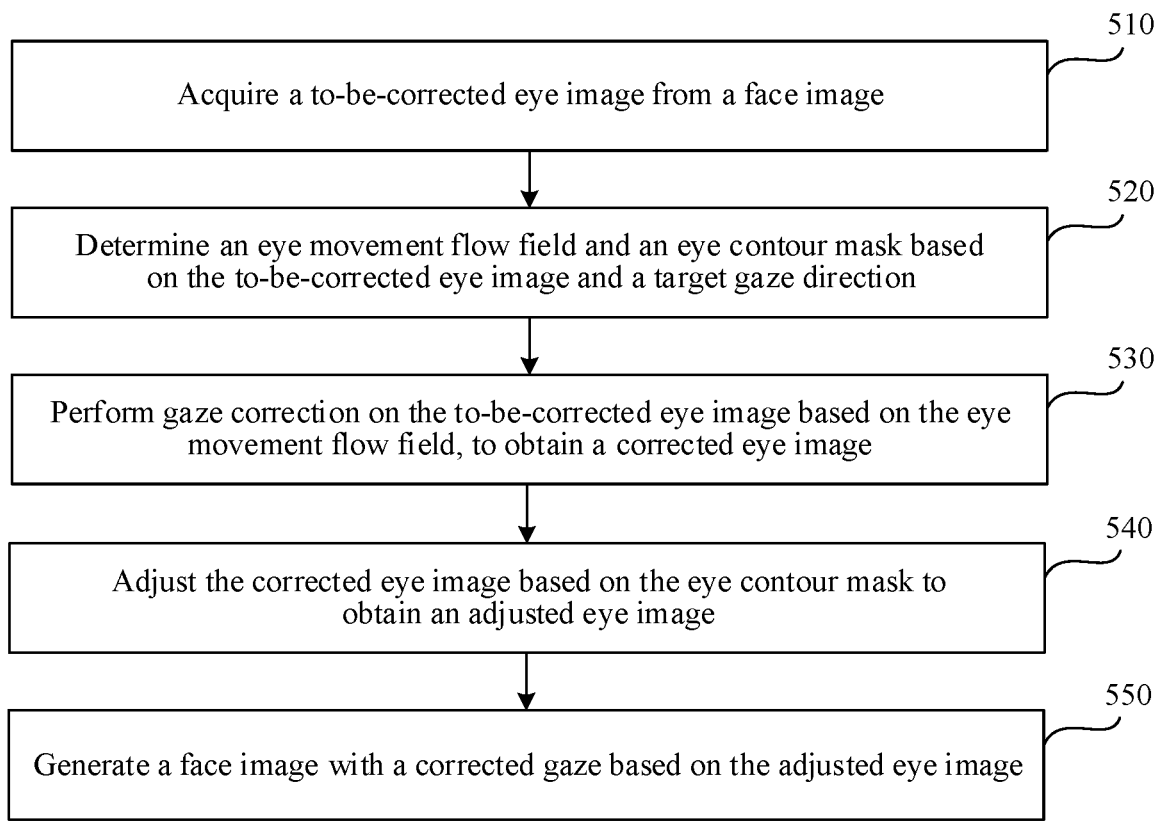
FIG. 5 is a flowchart of a gaze correction method for a face image according to an embodiment of the disclosure.

FIG. 5 is a flowchart of a gaze correction method for a face image according to an embodiment of the disclosure. Steps of the method may be performed by a terminal device such as a mobile phone, a tablet computer, a PC, and the like, or may be performed by a server. The method may include the following steps (510-550).

Step 510: Acquire a to-be-corrected eye image from a face image.

For example, face detection is first performed on the face image to determine whether a face is included in the face image, and a position of the face is determined when it is determined that the face is included. For example, in the case that a face is included in the face image, key points of the face are detected. Since the embodiment of the disclosure focuses on the eye region, only the key points of eyes may be detected, and key points of other parts such as a mouth and a nose are not required to be detected.

In some embodiments, a minimum bounding rectangle of a single eye is determined based on a contour key point of the single eye. The minimum bounding rectangle of the single eye is magnified by a specified multiple to obtain a screenshot-taking box of the single eye. A screenshot of a to-be-corrected eye image of the single eye is taken from the face image based on the screenshot-taking box of the single eye.

The minimum bounding rectangle of the single eye is a minimum bounding rectangle box including the single eye. For example, the minimum bounding rectangle of the left eye is the minimum bounding rectangle box including the left eye. The specified multiple may be a preset value, such as 1.5 times, 2 times, 3 times, or the like, which is not limited in the embodiment of the disclosure. During the magnification of the minimum bounding rectangle of the single eye to obtain the screenshot-taking box, a center point of the minimum bounding rectangle is used as a center and is magnified proportionally to obtain the screenshot-taking box. A center point of the screenshot-taking box coincides with the center point of the minimum bounding rectangle.

Finally, a screenshot of an image content in the screenshot-taking box of the single eye is taken from the face image by using the image screenshot-taking technology, so as to obtain the to-be-corrected eye image of the single eye.

In some embodiments, minimum bounding rectangles of all eyes are determined based on the contour key points of all of the eyes in the face image. The minimum bounding rectangles of all of the eyes are magnified by a specified multiple to obtain screenshot-taking boxes of all of the eyes. Screenshots of to-be-corrected eye images including all of the eyes are taken from the face image based on the screenshot-taking boxes of all of the eyes.

Compared with direct gaze correction on the face image, the acquisition of the to-be-corrected eye image from the face image and the gaze correction on the to-be-corrected eye image may reduce a calculation amount of subsequent steps and improve efficiency.

Step 520: Determine an eye movement flow field and an eye contour mask based on the to-be-corrected eye image and a target gaze direction.

For example, the target gaze direction is a gaze direction to which an eye gaze in the to-be-corrected eye image is to be corrected, and the eye movement flow field is used to adjust a pixel position in the to-be-corrected eye image. For the description of the target gaze direction and the eye movement flow field, reference may be made to the foregoing embodiments, and the details are not described herein again.

The eye contour mask indicates a probability that the pixel position in the to-be-corrected eye image is in an eye region. For example, the eye contour mask may be represented as a one-dimensional image. Dimensions (including a height and a width) of the one-dimensional image are the same as dimensions of the to-be-corrected eye image. A pixel value of a certain pixel in the eye contour mask may be a probability value, which indicates a probability that the pixel at the same position in the to-be-corrected eye image is in the eye region. For example, the pixel value of a position with coordinates of (i, j) in the eye contour mask may be a probability value belonging to a value range of [0, 1], which indicates a probability that the pixel of the position with coordinates of (i, j) in the to-be-corrected eye image is in the eye region.

In some embodiments, the to-be-corrected eye image and the target gaze direction are inputted to a gaze correction model, feature extraction is performed on the foregoing input data by using the gaze correction model, and the eye movement flow field and the eye contour mask are outputted. The gaze correction model may be a machine learning model obtained by training a neural network in advance.

For example, step 520 may be implemented by: performing channel dimension-based combination on the to-be-corrected eye image and the target gaze direction to obtain combined data; performing feature extraction on the combined data by using a gaze correction model, to obtain output data of the gaze correction model; and extracting the eye movement flow field and the eye contour mask from the output data.

For example, the to-be-corrected eye image may include images of R, G, and B channels, and the target gaze direction may include images of both of a pitch channel and a yaw channel. The combined data is obtained by combining the to-be-corrected eye image with the target gaze direction in a channel dimension. The combined data may include the images of the foregoing five channels (R, G, and B channels, the pitch channel, and the yaw channel). In addition, in a case that the target gaze direction includes a pitch angle equal to 0° and a yaw angle equal to 0°, pixel values of pixels in the image corresponding to the pitch channel are 0, and pixel values of pixels in the image corresponding to the yaw channel are also 0.

The gaze correction model may be a neural network model, for example, which may include a coding network and a decoding network. The coding network is configured to down-sample the combined data to obtain feature information of the combined data. The decoding network is configured to up-sample the feature information to obtain output data.

The output data may include images (or referred to as data) of three channels, and the data of a first channel and a second channel are extracted from the output data to obtain the eye movement flow field. The data of a third channel is extracted from the output data to obtain the eye contour mask. For example, the data of the first channel is used as a first dimension image to store a horizontal displacement of each pixel. The data of the second channel is used as a second dimension image to store a vertical displacement of each pixel.

In an example, it is assumed that a height of the to-be-corrected eye image is H and a width thereof is W. H and W may respectively represent a quantity of pixels in a height direction and a quantity of pixels in a width direction. The to-be-corrected eye image is a three-channel image of H×W×3, and the target gaze direction is a two-channel image of H×W×2. The three-channel image and the two-channel image are combined in the channel dimension to obtain combined data of H×W×5. The output data of the gaze correction model includes the three-channel image of H×W×3, from which data H×W×2 of two channels is extracted as the eye movement flow field and data H×W×1 of the remaining one channel is extracted as the eye contour mask.

For example, the gaze correction model is a student gaze correction model obtained by performing knowledge distillation training on a plurality of teacher gaze correction models. Compared to a model structure and/or a model parameter of the teacher gaze correction model, a model structure and/or a model parameter of the student gaze correction model are/is simplified. In this way, a gaze correction model with an excellent gaze correction effect and a small model volume may be obtained by the training, which is applicable to a mobile device such as a mobile phone.

Step 530: Perform gaze correction on the to-be-corrected eye image based on the eye movement flow field, to obtain a corrected eye image.

For example, for any pixel in the to-be-corrected eye image, a horizontal displacement and a vertical displacement of the pixel are acquired from the eye movement flow field, and then the pixel is displaced based on the horizontal displacement and the vertical displacement to obtain a corrected eye image.

It is assumed that the to-be-corrected eye image is x, the corrected eye image is y, and the eye movement flow field is f. For any position with coordinates of (i, j) in the image, y(i, j) is calculated by using y(i, j)=x(i+f(i, j)[0], j+f(i, j)[1]). Since i+f(i, j)[0] and j+f(i, j)[1] are floating point numbers, bilinear interpolation is required to calculate i+f(i, j)[0] and j+f(i, j)[1].

Step 540: Adjust the corrected eye image based on the eye contour mask to obtain an adjusted eye image.

For example, step 540 may be implemented by: multiplying the eye contour mask by a pixel value in the corrected eye image corresponding to a same position, to obtain a first intermediate image; multiplying a mapped image corresponding to the eye contour mask by the pixel value in the to-be-corrected eye image corresponding to the same position, to obtain a second intermediate image; and summing pixel values in the first intermediate image and the second intermediate image corresponding to the same position, to obtain the adjusted eye image.

In combination with the description in the foregoing embodiment, the pixel value of each position in the eye contour mask is a probability value belonging to the value range of [0, 1]. The pixel value of any position in a mapped image corresponding to the eye contour mask is a value obtained by subtracting the pixel value (that is, the probability value) of the same position in the eye contour mask from 1. For example, the pixel value (that is, the probability value) of the position with coordinates of (i, j) in the eye contour mask is 0.2, and the pixel value of the position with coordinates of (i, j) in the mapped image corresponding to the eye contour mask is 1-0.2=0.8.

The foregoing generated adjusted eye image may be expressed by using the following formula: an adjusted eye image=an eye contour mask × a corrected eye image+(1−the eye contour mask)×a to-be-corrected eye image.

Step 550: Generate a face image with a corrected gaze based on the adjusted eye image.

For example, the to-be-corrected eye image in the face image is replaced with the adjusted eye image to obtain the face image with the corrected gaze.

For example, the adjusted eye image is ensembled to a position of a screenshot-taking box for the to-be-corrected eye image in the face image to obtain an ensembled image. Image harmonization is performed at the screenshot-taking box position in the ensembled image to obtain a face image with a corrected gaze. The purpose of the image harmonization is to eliminate boundary traces at the screenshot-taking box position. In the embodiment of the disclosure, the method used by the image harmonization is not limited, such as Gaussian blur, erosion and dilation, an image harmonization method based on deep learning, or the like.

In an example embodiment, image harmonization is performed on the screenshot-taking box position in the ensembled image in the following manner, to obtain a face image with a corrected gaze.

1. Generate an initialized mask image having same dimensions as the face image, a pixel value of the initialized mask image at the screenshot-taking box position being 1, and a pixel value at the remaining positions being 0.

For example, it is assumed that dimensions of the original face image are C×H×W. C is a quantity of channels (such as including R, G, and B channels), H is a height (such as a quantity of pixels included in a height direction), and W is a width (such as a quantity of pixels included in a width direction). In addition, assuming that the foregoing screenshot-taking box is a rectangular frame having dimensions of h×w at a target position in the face image, h being the height (such as a quantity of pixels included in the height direction), and w being the width (such as a quantity of pixels included in the width direction), the dimensions of the to-be-corrected eye image and the corrected eye image are both c×h×w, c being the quantity of channels (including R, G, and B channels).

An initialized mask image having dimensions of C×H×W is generated. For each single-channel image H×W in the C channels, the pixel value in the h×w screenshot-taking box at the above target position is set to 1, and the pixel value of other regions except the screenshot-taking box is set to 0, which is used as the initialized mask image.

2. Perform a corrosion operation and Gaussian blur on the initialized mask image to obtain a processed mask image.

The purpose of the erosion operation is to remove a boundary point between objects. For example, the erosion operation may be performed on the initialized mask image by using an elliptical template to obtain a corroded mask image. The Gaussian blur, also referred to as Gaussian smoothing, is used for reducing image noise and the level of detail. After the foregoing corroded mask image is obtained, the Gaussian blur may be performed on the corroded mask image to obtain a processed mask image. The processed mask image is still an image having dimensions of C×H×W, and the value of each pixel is in a range of [0, 1]. Especially for the pixel at a boundary between 0 and 1, after the erosion operation and Gaussian blur, the value is between 0 and 1, thereby achieving a smooth transition.

3. Multiply the processed mask image by the pixel value corresponding to the same position in the ensembled image to obtain a first generated image.

4. Multiply the mapped image corresponding to the processed mask image by the pixel value corresponding to the same position in the face image to obtain a second generated image.

5. Sum the pixel values corresponding to the same position in the first generated image and the second generated image to obtain a face image with a corrected gaze.

The pixel value of each position in the processed mask image is a value in the value range of [0, 1], and the pixel value of any position in the mapped image corresponding to the processed mask image is a value obtained by subtracting the pixel value of the same position in the processed mask image from 1. For example, the pixel value of the position with coordinates of (i, j) in the processed mask image is 0.3, and the pixel value of the position with coordinates of (i, j) in the mapped image corresponding to the processed mask image is 1-0.3=0.7.

The generated face image with the corrected gaze may be expressed by using the following formula: the face image with the corrected gaze=the processed mask image×the ensembled image+(1−the processed mask image)×the face image.

The boundary trace at the screenshot-taking box position in the ensembled image may be eliminated in the foregoing manner, so that the finally obtained face image with the corrected gaze has no obvious splicing traces and has a better effect.

Figure 6:
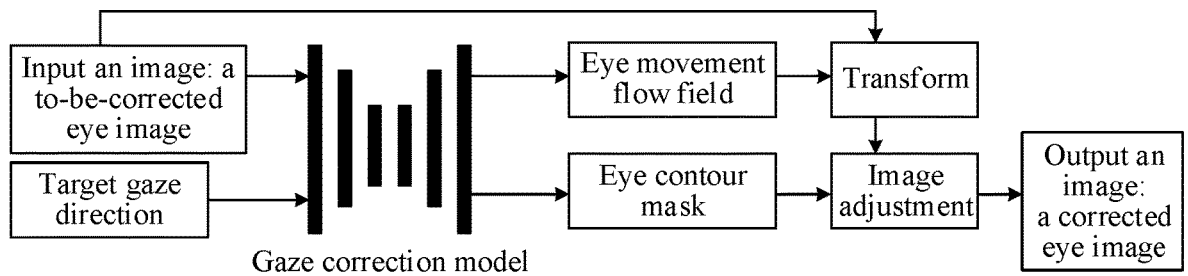
FIG. 6 is a schematic diagram of a gaze correction model according to an embodiment of the disclosure.

As shown in FIG. 6, the to-be-corrected eye image and the target gaze direction are inputted to a gaze correction model, the eye movement flow field and the eye contour mask are outputted by the gaze correction model, and the to-be-corrected eye image is transformed based on the eye movement flow field to generate a transformed eye image (equivalent to the corrected eye image in step 530). Then the transformed eye image is adjusted based on the eye contour mask to obtain a final corrected eye image (equivalent to the adjusted eye image in step 540).

Based on the above, in the technical solution provided in the embodiments of the disclosure, the screenshot of the to-be-corrected eye image taken from the face image includes both the eye region inside the eye contour and a non-eye region outside the eye contour. In the embodiment of the disclosure, the adjusted eye image is obtained by using the eye contour mask to adjust the corrected eye image. The adjusted eye image may be used as the final corrected eye image, so as to retain the result of pixel displacement by the eye movement flow field for the eye region inside the eye contour. For the non-eye region outside the eye contour, original image information may be retained, which realizes the fusion of an original to-be-corrected eye image and the eye image corrected by the eye movement flow field through an attention mechanism, and ensures the gaze correction to be performed only on the image content inside the eye contour. Since the gaze correction is not required to be performed on the image content outside the eye contour, the gaze correction effect of the final corrected eye image may be improved.

An example embodiment of a training process of the gaze correction model is described below. The content involved in use of the gaze correction model and the content involved in the training process correspond to each other and are interconnected. If a detailed description is not given on one side, reference may be made to the description on the other side.

Figure 7:
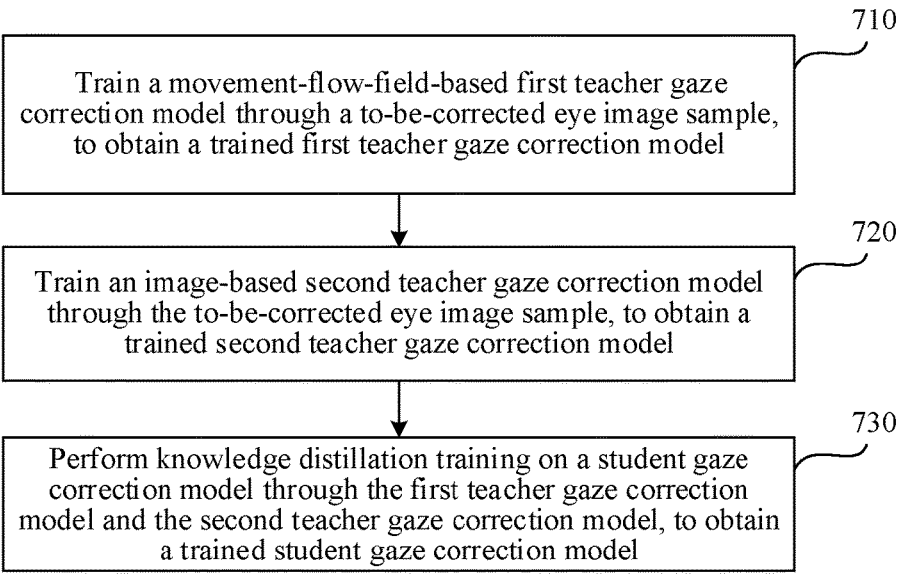
FIG. 7 is a flowchart of a method for training a gaze correction model according to an embodiment of the disclosure.

FIG. 7 is a flowchart of a method for training a gaze correction model according to an embodiment of the disclosure. Steps of the method may be performed by a computer device such as a computer and a server. The method may include the following steps (710-730).

Step 710: Train a movement-flow-field-based first teacher gaze correction model by using a to-be-corrected eye image sample, to obtain a trained first teacher gaze correction model, the trained first teacher gaze correction model being configured to output an eye movement flow field of the to-be-corrected eye image sample, the eye movement flow field being configured to adjust a pixel position in the to-be-corrected eye image sample.

For example, the first teacher gaze correction model may be a neural network model. For example, input data of the model includes a to-be-corrected eye image sample and a target gaze direction, and output data of the first teacher gaze correction model includes an eye movement flow field and an eye contour mask.

In some embodiments, step 710 may include the following sub steps.

1. Acquire a training sample of the first teacher gaze correction model, the training sample including the to-be-corrected eye image sample and a target corrected eye image.

For example, each training sample includes two images, which are respectively two images of different gazes captured for the same person at the same head posture angle. One image may be an image in any gaze direction, which is used as the to-be-corrected eye image sample. The other image is an image with the target gaze direction, which is used as the target corrected eye image. It should be noted that different training samples may include different persons or have different head postures. That is to say, a training sample set of the model may include a plurality of training samples. The plurality of training samples may include training samples having different persons and include training samples having different head postures, so that the trained model may adapt to the different persons and the different head postures, thereby improving the robustness of the model.

2. Perform eye feature extraction on the to-be-corrected eye image sample by using the first teacher gaze correction model, to obtain the eye movement flow field and an eye contour mask of the to-be-corrected eye image sample, the eye contour mask indicating a probability that the pixel position in the to-be-corrected eye image sample is in an eye region.

Figure 8:
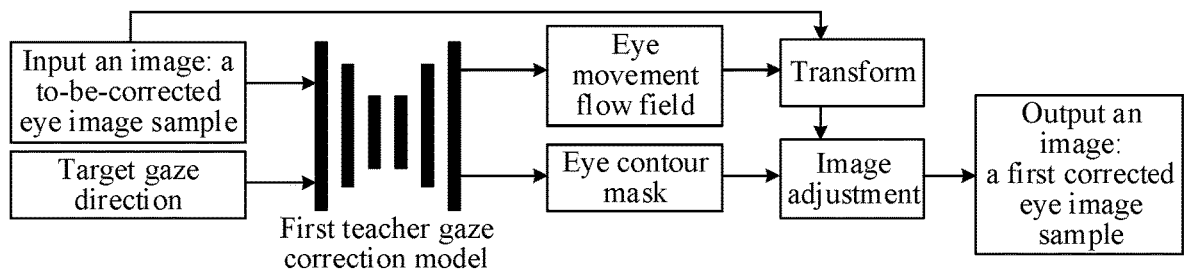
FIG. 8 is a schematic diagram of a training process of a first teacher gaze correction model according to an embodiment of the disclosure.

As shown in FIG. 8, channel dimension-based combination is performed on the to-be-corrected eye image sample and the target gaze direction to obtain combined data; feature extraction is performed on the combined data by using a first teacher gaze correction model, to obtain output data; and the eye movement flow field and the eye contour mask are extracted from the output data.

In an example, it is assumed that a height of the to-be-corrected eye image sample is H and a width thereof is W. H and W may respectively represent a quantity of pixels in a height direction and a quantity of pixels in a width direction. The to-be-corrected eye image sample is a three-channel image of H×W×3, and the target gaze direction is a two-channel image of H×W×2. The three-channel image and the two-channel image are combined in the channel dimension to obtain combined data of H×W×5, and the combined data is inputted to the first teacher gaze correction model. The output data of the first teacher gaze correction model includes the three-channel image of H×W×3, from which data H×W×2 of two channels is extracted as the eye movement flow field and data H×W×1 of the remaining one channel is extracted as the eye contour mask.

It should be noted that in the training process, the target gaze direction may be a direction (0°, 0°) of facing a camera, or may be any other direction, so that the model has the ability to correct the gaze to any predetermined direction.

3. Determine a corrected eye image sample based on the to-be-corrected eye image sample and the corresponding eye movement flow field and eye contour mask.

For example, the to-be-corrected eye image sample is transformed based on the eye movement flow field to obtain a transformed eye image sample, and then the transformed eye image sample is adjusted based on the eye contour mask to obtain the corrected eye image sample. The process may be the same as or similar to step 530 and step 540 described in the embodiment of FIG. 5. For details, reference is made to the introduction and description in the embodiment of FIG. 5. Details are not described herein again.

4. Construct a loss function of the first teacher gaze correction model based on the corrected eye image sample and the target corrected eye image, and adjust a parameter of the first teacher gaze correction model based on the loss function of the first teacher gaze correction model.

For example, the loss function of the first teacher gaze correction model may be constructed based on a difference between the corrected eye image sample and the target corrected eye image. For example, a reconstruction loss between the corrected eye image sample and the target corrected eye image is used as a loss of the first teacher gaze correction model. Then the parameter of the first teacher gaze correction model is adjusted based on the loss function of the first teacher gaze correction model by using a gradient descent algorithm, to optimize model parameters.

Step 720: Train an image-based second teacher gaze correction model by using the to-be-corrected eye image sample, to obtain a trained second teacher gaze correction model, the trained second teacher gaze correction model being configured to output a corrected eye image sample of the to-be-corrected eye image sample.

For example, the second teacher gaze correction model may be a neural network model. For example, input data of the model includes a to-be-corrected eye image sample and a target gaze direction, and output data includes a corrected eye image sample and an eye contour mask. A difference between the second teacher gaze correction model and the first teacher gaze correction model is that the second teacher gaze correction model directly outputs a corrected eye image sample obtained with a corrected gaze.

In some embodiments, step 720 may be implemented in the following manner.

1. Acquire a training sample of the second teacher gaze correction model, the training sample including the to-be-corrected eye image sample and a target corrected eye image.

For example, the training sample used by the second teacher gaze correction model may be the same as or different from the training sample used by the first teacher gaze correction model. However, regardless of whether the training samples are the same or different, each training sample includes the to-be-corrected eye image sample and the target corrected eye image.

2. Perform gaze correction on the to-be-corrected eye image sample through the second teacher gaze correction model, to obtain a corrected eye image sample and an eye contour mask, the eye contour mask being configured to indicate a probability that the pixel position in the to-be-corrected eye image sample is in an eye region.

Figure 9:
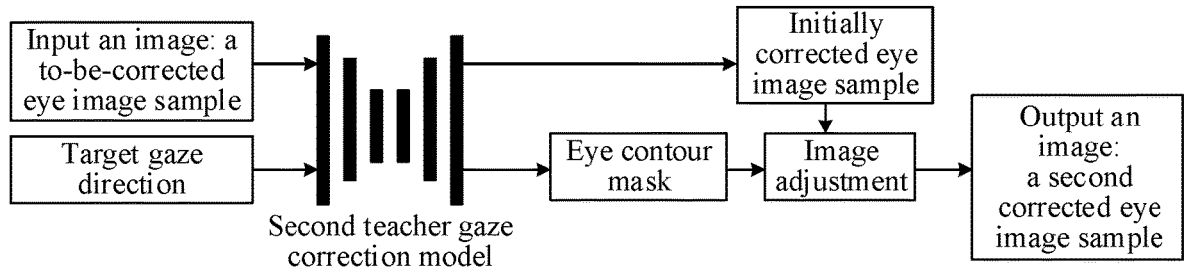
FIG. 9 is a schematic diagram of a training process of a second teacher gaze correction model according to an embodiment of the disclosure.

As shown in FIG. 9, channel dimension-based combination is performed on the to-be-corrected eye image sample and the target gaze direction to obtain combined data; the combined data is processed through a second teacher gaze correction model, to obtain output data; and the corrected eye image sample and the eye contour mask are extracted from the output data.

In an example, it is assumed that a height of the to-be-corrected eye image sample is H and a width thereof is W. H and W may respectively represent a quantity of pixels in a height direction and a quantity of pixels in a width direction. The to-be-corrected eye image sample is a three-channel image of H×W×3, and the target gaze direction is a two-channel image of H×W×2. The three-channel image and the two-channel image are combined in the channel dimension to obtain combined data of H×W×5, and the combined data is inputted to the second teacher gaze correction model. The output data of the second teacher gaze correction model includes a four-channel image of H×W×4, from which data H×W×3 of three channels is extracted as the corrected eye image sample and data H×W×1 of the remaining one channel is extracted as the eye contour mask.

3. Adjust the corrected eye image sample based on the eye contour mask, to obtain an adjusted eye image sample.

For example, the eye contour mask is multiplied by the pixel value of the same position in the corrected eye image sample to obtain a third intermediate image; a mapped image corresponding to the eye contour mask is multiplied by the pixel value of the same position in the to-be-corrected eye image sample to obtain a fourth intermediate image; and the pixel values of the same position in the third intermediate image and the fourth intermediate image are summed to obtain an adjusted eye image sample. The process may be the same as or similar to the manner of generating the adjusted eye image described in step 540 in the embodiment of FIG. 5. For details, reference may be made to the foregoing description, and the details are not described herein again.

4. Construct a loss function of the second teacher gaze correction model based on the adjusted eye image sample and the target corrected eye image, and adjust a parameter of the second teacher gaze correction model based on the loss function of the second teacher gaze correction model.

For example, the loss function of the second teacher gaze correction model may be constructed based on a difference between the adjusted eye image sample and the target corrected eye image. For example, a reconstruction loss between the adjusted eye image sample and the target corrected eye image is used as a loss of the second teacher gaze correction model. Then the parameter of the second teacher gaze correction model is adjusted based on the loss of the second teacher gaze correction model by using a gradient descent algorithm, to optimize model parameters.

Step 730: Perform knowledge distillation training on a student gaze correction model through the first teacher gaze correction model and the second teacher gaze correction model, to obtain a trained student gaze correction model.

In the embodiment of the disclosure, the purpose of the knowledge distillation training process is to allow the student gaze correction model to learn knowledge learned by the first teacher gaze correction model and the second teacher gaze correction model, thereby generating a student gaze correction model having an excellent gaze correction effect and a small model volume, which is applicable to the mobile device such as the mobile phone.

During the training of the student gaze correction model, the model parameters of the first teacher gaze correction model and the second teacher gaze correction model are fixed, and the performance of the student gaze correction model is optimized by adjusting the parameters of the student gaze correction model.

In some embodiments, step 730 may be implemented in the following manner.

1. Acquire a training sample of the student gaze correction model, the training sample including the to-be-corrected eye image sample and a target corrected eye image.

The training sample used by the student gaze correction model may be the same as or different from the training sample used by the first and/or second teacher gaze correction model. However, regardless of whether the training samples are the same or different, each training sample includes the to-be-corrected eye image sample and the target corrected eye image.

2. Output a teacher eye movement flow field and a first teacher eye contour mask of the to-be-corrected eye image sample through the trained first teacher gaze correction model, and generate a first output image based on the to-be-corrected eye image sample, the corresponding teacher eye movement flow field, and the corresponding first teacher eye contour mask.

The process may be the same as or similar to the process of generating the corrected eye image sample described in step 710, and the details are not described herein again.

3. Output a corrected image and a second teacher eye contour mask of the to-be-corrected eye image sample through the trained second teacher gaze correction model, and generate a second output image based on the corrected image and the second teacher eye contour mask.

The process may be the same as or similar to the process of generating the adjusted eye image sample described in step 720, and the details are not described herein again.

4. Output a student eye movement flow field and a student eye contour mask of the to-be-corrected eye image sample through the student gaze correction model, and generate a third output image based on the to-be-corrected eye image sample, the corresponding student eye movement flow field, and the corresponding student eye contour mask.

Figure 10:
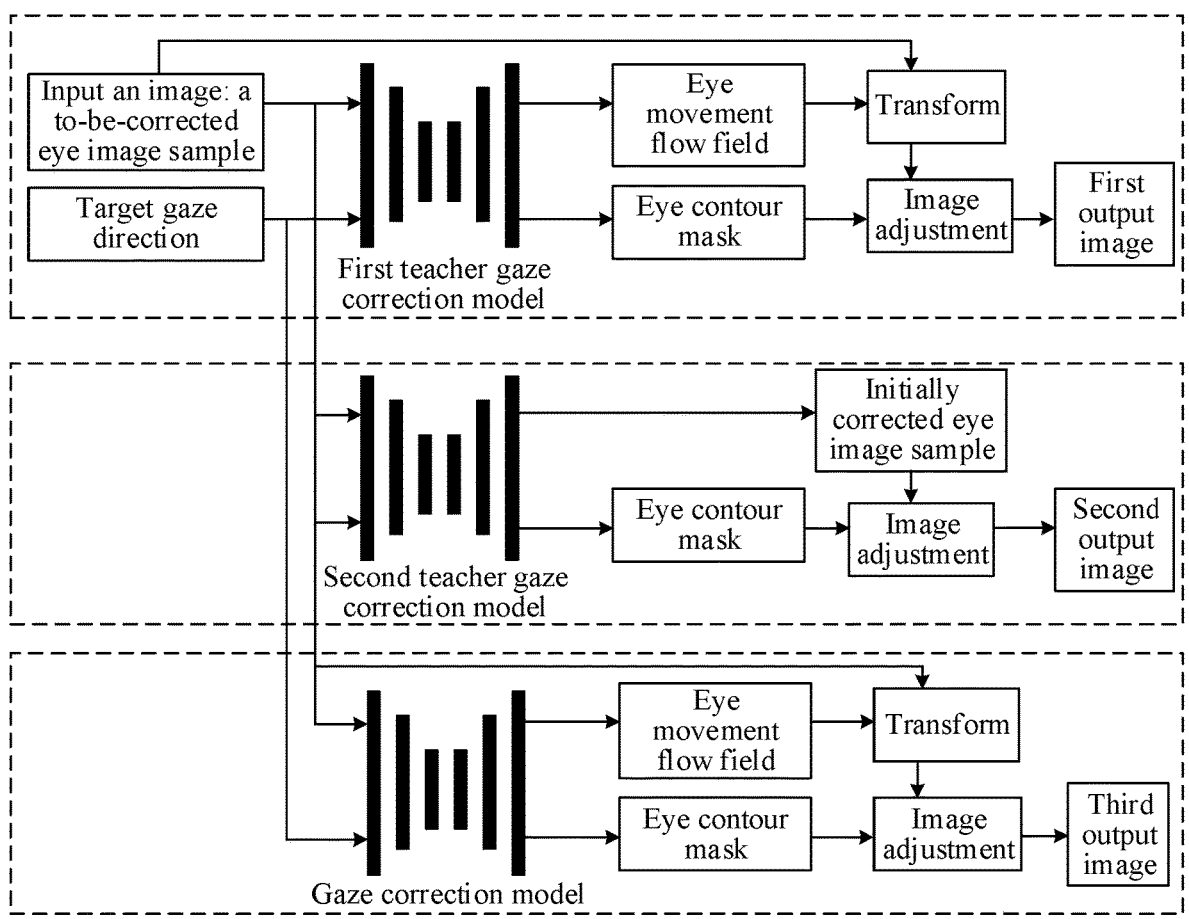
FIG. 10 is a schematic diagram of a training process of a student gaze correction model according to an embodiment of the disclosure.

As shown in FIG. 10, input data of the student gaze correction model includes a to-be-corrected eye image sample and a target gaze direction, and output data of the student gaze correction model includes a student eye movement flow field and a student eye contour mask.

For example, the to-be-corrected eye image sample is transformed by using the student eye movement flow field, to generate a transformed image. The transformed image is adjusted by using the student eye contour mask, to generate a third output image.

5. Construct a loss function of the student gaze correction model based on a difference between the first output image and the third output image, a difference between the second output image and the third output image, and a difference between the third output image and the target corrected eye image.

In some embodiments, a first sub-loss is determined based on the difference between the first output image and the third output image; a second sub-loss is determined based on the difference between the second output image and the third output image; a third sub-loss is determined based on the difference between the third output image and the target corrected eye image; and weighted summation is performed on the first sub-loss, the second sub-loss, and the third sub-loss to obtain the loss function of the student gaze correction model.

For example, the loss function L of the student gaze correction model may be calculated by using the following formula:

$$L = Kd\_loss + Rec\_loss$$

$Kd\_loss = w1 \times LPIPS$ Loss (teacher1_img, student_img) + $w2 \times LPIPS$ Loss (teacher2_img, student_img), and $Rec\_loss = w3 \times L1$ Loss (student_img, img_tar).

w1, w2, and w3 respectively represent three weight values, which may be adjustable values, for example, w1+w2+w3=1. LPIPS Loss (teacher1_img, student_img) represents the first sub-loss, LPIPS Loss (teacher2_img, student_img) represents the second sub-loss, and L1 Loss (student_img, img_tar) represents the third sub-loss. teacher1_img represents the first output image, teacher2_img represents the second output image, student_img represents the third output image, and img_tar represents the target corrected eye image. In the foregoing formula, the first sub-loss and the second sub-loss use a learned perceptual image patch similarity (LPIPS) loss, and the third sub-loss uses an L1 loss.

6. Adjust a parameter of the student gaze correction model based on the loss function of the student gaze correction model, to obtain a trained student gaze correction model.

Then the parameter of the student gaze correction model is adjusted based on the loss of the student gaze correction model by using a gradient descent algorithm, to optimize model parameters.

Based on the above, in the technical solution provided in the embodiments of the disclosure, the final student gaze correction model for online use is trained and generated through multi-teacher distillation, so that the student gaze correction model may learn the knowledge learned by the first teacher gaze correction model and the second teacher gaze correction model, thereby generating a student gaze correction model having an excellent gaze correction effect and a small model volume, which is applicable to the mobile device such as the mobile phone.

In addition, the first teacher gaze correction model is a movement-flow-field-based model, output data of the first teacher gaze correction model includes an eye movement flow field, and the gaze correction is performed based on the eye movement flow field. Since the pixel in the original to-be-corrected eye image is displaced to achieve the gaze correction, the first teacher gaze correction model may effectively retrain the original image feature. However, in the case of a relatively large offset of the eye gaze, if the content of the eye contour has only a small quantity of pixels corresponding to eyeballs, distortion may occur during the gaze correction through pixel displacement. Therefore, another image-based second teacher gaze correction model is trained. Since output data of the second teacher gaze correction model includes the corrected eye image, the second teacher gaze correction model may effectively overcome the problem of distortion. Finally, the student gaze correction model is trained by two teacher models through multi-teacher distillation learning, so that the student gaze correction model may have respective advantages of the two teacher models, so as to generate a more realistic and less distorted corrected eye image.

The following is apparatus embodiments of the disclosure, which may be used for executing the method embodiments of the disclosure. For details not disclosed in the apparatus embodiments of the disclosure, reference is made to the method embodiments of the disclosure.

Figure 11:
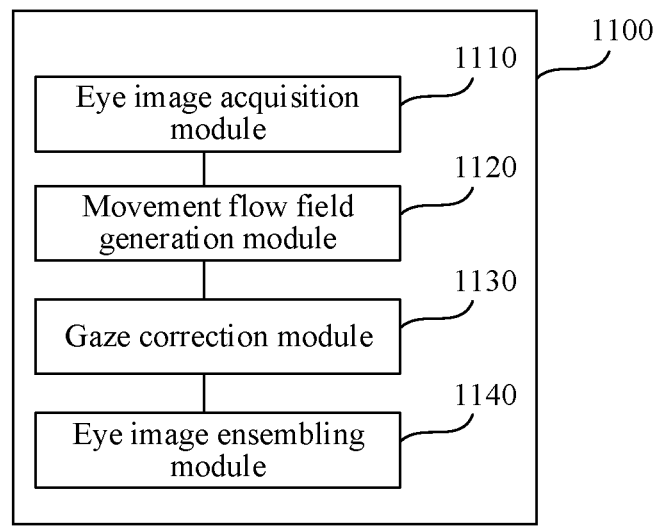
FIG. 11 is a block diagram of a gaze correction apparatus for a face image according to an embodiment of the disclosure.

FIG. 11 is a block diagram of a gaze correction apparatus for a face image according to an embodiment of the disclosure. The apparatus has a function of implementing the gaze correction method for a face image, and the function may be implemented by hardware or by hardware executing corresponding software. The apparatus may be a computer device, or may be disposed in a computer device. The apparatus 1100 may include an eye image acquisition module 1110, a movement flow field generation module 1120, a gaze correction module 1130, and an eye image ensembling module 1140.

The eye image acquisition module 1110 is configured to acquire a to-be-corrected eye image from a face image. The movement flow field generation module 1120 is configured to determine an eye movement flow field based on the to-be-corrected eye image and a target gaze direction. The target gaze direction is a gaze direction to which an eye gaze in the to-be-corrected eye image is to be corrected, and the eye movement flow field is used to adjust a pixel position in the to-be-corrected eye image. The gaze correction module 1130 is configured to perform gaze correction on the to-be-corrected eye image based on the eye movement flow field, to obtain a corrected eye image. The eye image ensembling module 1140 is configured to generate a face image with a corrected gaze based on the corrected eye image.

In some embodiments, the movement flow field generation module 1120 is further configured to determine an eye contour mask based on the to-be-corrected eye image and the target gaze direction. The eye contour mask is configured to indicate a probability that the pixel position in the to-be-corrected eye image is in an eye region. The eye image ensembling module 1140 is further configured to: adjust the corrected eye image based on the eye contour mask, to obtain an adjusted eye image; and replace the to-be-corrected eye image in the face image with the adjusted eye image, to obtain the face image with a corrected gaze.

In some embodiments, the movement flow field generation module 1120 is further configured to: perform channel dimension-based combination on the to-be-corrected eye image and the target gaze direction to obtain combined data; perform feature extraction on the combined data through a gaze correction model, to obtain output data of the gaze correction model; and extract the eye movement flow field and the eye contour mask from the output data.

In some embodiments, the gaze correction model is a student gaze correction model trained by a plurality of teacher gaze correction models. A training process of the student gaze correction model includes: training a movement-flow-field-based first teacher gaze correction model by using a to-be-corrected eye image sample, to obtain a trained first teacher gaze correction model, the trained first teacher gaze correction model being configured to output an eye movement flow field of the to-be-corrected eye image sample; training an image-based second teacher gaze correction model by using the to-be-corrected eye image sample, to obtain a trained second teacher gaze correction model, the second teacher gaze correction model being configured to output a corrected eye image sample of the to-be-corrected eye image sample; and performing knowledge distillation training on the student gaze correction model by using the trained first teacher gaze correction model and the trained second teacher gaze correction model, to obtain a trained student gaze correction model.

In some embodiments, the eye image ensembling module 1140 is configured to: multiply the eye contour mask by a pixel value in the corrected eye image corresponding to a same position, to obtain a first intermediate image; multiply a mapped image corresponding to the eye contour mask by the pixel value in the to-be-corrected eye image corresponding to the same position, to obtain a second intermediate image; and sum pixel values in the first intermediate image and the second intermediate image corresponding to the same position, to obtain the adjusted eye image.

Figure 12:
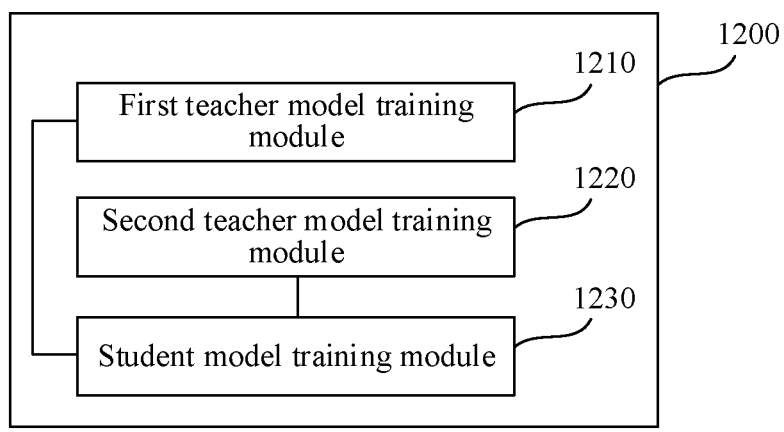
FIG. 12 is a block diagram of an apparatus for training a gaze correction model according to an embodiment of the disclosure.

FIG. 12 is a block diagram of an apparatus for training a gaze correction model according to an embodiment of the disclosure. The apparatus has a function of implementing the method for training a gaze correction model, and the function may be implemented by hardware or by hardware executing corresponding software. The apparatus may be a computer device, or may be disposed in a computer device. The apparatus 1200 may include a first teacher model training module 1210, a second teacher model training module 1220, and a student model training module 1230.

The first teacher model training module 1210 is configured to train a movement-flow-field-based first teacher gaze correction model by using a to-be-corrected eye image sample, to obtain a trained first teacher gaze correction model. The trained first teacher gaze correction model is configured to output an eye movement flow field of the to-be-corrected eye image sample. The eye movement flow field is used to adjust a pixel position in the to-be-corrected eye image sample. The second teacher model training module 1220 is configured to train an image-based second teacher gaze correction model by using the to-be-corrected eye image sample, to obtain a trained second teacher gaze correction model. The trained second teacher gaze correction model is configured to output a corrected eye image sample of the to-be-corrected eye image sample. The student model training module 1230 is configured to perform knowledge distillation training on the student gaze correction model by using the trained first teacher gaze correction model and the trained second teacher gaze correction model, to obtain a trained student gaze correction model.

In some embodiments, the first teacher model training module 1210 is configured to: acquire a training sample of the first teacher gaze correction model, the training sample including the to-be-corrected eye image sample and a target corrected eye image; perform eye feature extraction on the to-be-corrected eye image sample by using the first teacher gaze correction model, to obtain the eye movement flow field and an eye contour mask of the to-be-corrected eye image sample, the eye contour mask being configured to indicate a probability that the pixel position in the to-be-corrected eye image sample is in an eye region; determine a corrected eye image sample based on the to-be-corrected eye image sample and the corresponding eye movement flow field and eye contour mask; and construct a loss function of the first teacher gaze correction model based on the corrected eye image sample and the target corrected eye image, and adjust a parameter of the first teacher gaze correction model based on the loss function of the first teacher gaze correction model.

In some embodiments, the second teacher model training module 1220 is configured to: acquire a training sample of the second teacher gaze correction model, the training sample including the to-be-corrected eye image sample and a target corrected eye image; perform gaze correction on the to-be-corrected eye image sample by using the second teacher gaze correction model, to obtain a corrected eye image sample and an eye contour mask, the eye contour mask being configured to indicate a probability that the pixel position in the to-be-corrected eye image sample is in an eye region; adjust the corrected eye image sample based on the eye contour mask, to obtain an adjusted eye image sample; and construct a loss function of the second teacher gaze correction model based on the adjusted eye image sample and the target corrected eye image, and adjust a parameter of the second teacher gaze correction model based on the loss function of the second teacher gaze correction model.

In some embodiments, the student model training module 1230 is configured to: acquire a training sample of the student gaze correction model, the training sample including the to-be-corrected eye image sample and a target corrected eye image; output a teacher eye movement flow field and a first teacher eye contour mask of the to-be-corrected eye image sample by using the trained first teacher gaze correction model, and generate a first output image based on the to-be-corrected eye image sample and the corresponding teacher eye movement flow field and first teacher eye contour mask; output a corrected image and a second teacher eye contour mask of the to-be-corrected eye image sample by using the trained second teacher gaze correction model, and generate a second output image based on the corrected image and the second teacher eye contour mask; output a student eye movement flow field and a student eye contour mask of the to-be-corrected eye image sample by using the student gaze correction model, and generate a third output image based on the to-be-corrected eye image sample and the corresponding student eye movement flow field and student eye contour mask; construct a loss function of the student gaze correction model based on a difference between the first output image and the third output image, a difference between the second output image and the third output image, and a difference between the third output image and the target corrected eye image; and adjust a parameter of the student gaze correction model based on the loss function of the student gaze correction model, to obtain a trained student gaze correction model.

In some embodiments, the student model training module 1230 is configured to: transform the to-be-corrected eye image sample based on the student eye movement flow field, to obtain a transformed image; and adjust the transformed image by using the student eye contour mask, to obtain the third output image.

In some embodiments, the student model training module 1230 is configured to: determine a first sub-loss based on the difference between the first output image and the third output image; determine a second sub-loss based on the difference between the second output image and the third output image; determine a third sub-loss based on the difference between the third output image and the target corrected eye image; and perform weighted summation on the first sub-loss, the second sub-loss, and the third sub-loss to obtain the loss function of the student gaze correction model.

It should be noted that when the apparatus provided in the foregoing embodiments implements functions of the apparatus, only division of the foregoing function modules is used as an example for description. In the practical application, the functions may be assigned to and completed by different functional modules according to the requirements. That is, an internal structure of the device is divided into different functional modules, to implement all or some of the functions described above. In addition, the apparatus and method embodiments provided in the foregoing embodiments belong to one conception. For the implementation process, reference may be made to the method embodiments, and details are not described herein again.

Figure 13:
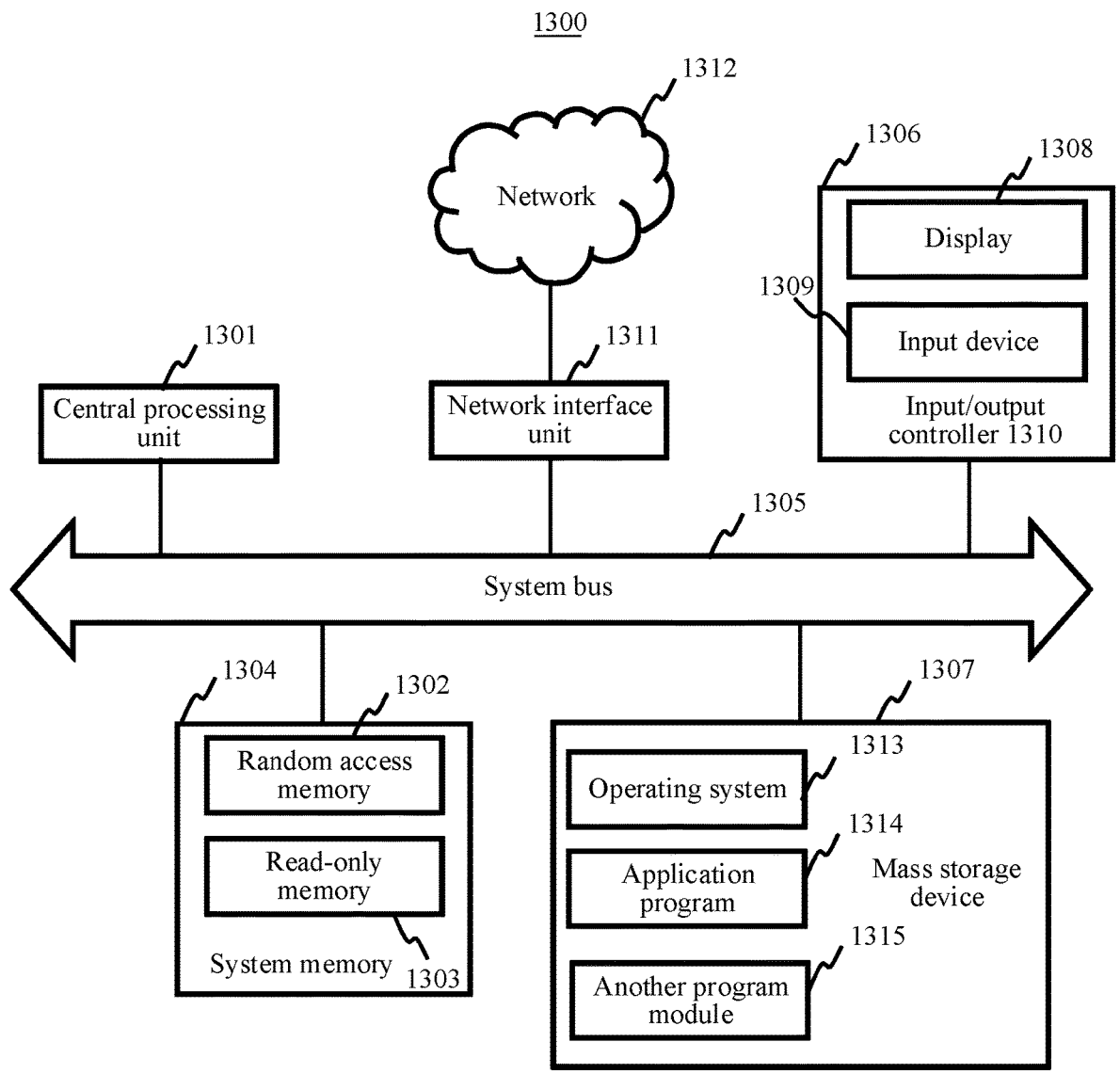
FIG. 13 is a schematic structural diagram of a computer device according to an embodiment of the disclosure.

FIG. 13 is a schematic structural diagram of a computer device according to an embodiment of the disclosure. The computer device may be any electronic device with a data computing function, a data processing function and a data storage function such as a mobile phone, a tablet computer, a personal computer (PC), a server, or the like. The computer device is configured to perform the gaze correction method for a face image, or the method for training a gaze correction model.

The computer device 1300 includes a processing unit (such as a central processing unit (CPU), a graphics processing unit (GPU), a field programmable gate array (FPGA) or the like) 1301, a random access memory (RAM) 1302, a system memory 1304 of a read only memory (ROM) 1303, and a system bus 1305 connecting the system memory 1304 to the CPU 1301. The computer device 1300 further includes a basic input/output (I/O) system 1306 assisting in transmitting information between devices in a server, and a mass storage device 1307 configured to store an operating system 1313, an application program 1314 and another program module 1315.

The basic input/output system 1306 includes a display 1308 configured to display information, and an input device 1309 configured to input information by a user, such as a mouse and a keyboard. The display 1308 and the input device 1309 are both connected to the CPU 1301 by using an input/output controller 1310 connected to the system bus 1305. The basic I/O system 1306 may further include the I/O controller 1310 configured to receive and process inputs from a plurality of other devices such as a keyboard, a mouse, or an electronic stylus. Similarly, the I/O controller 1310 further provides an output to a display screen, a printer, or another type of output device.

The mass storage device 1307 is connected to the CPU 1301 by using a mass storage controller (not shown) connected to the system bus 1305. The mass storage device 1307 and an associated computer-readable medium provide non-volatile storage for the computer device 1300. That is, the mass storage device 1307 may include a computer-readable medium (not shown) such as a hard disk or a compact disc read-only memory (CD-ROM) drive.

Without loss of generality, the computer-readable medium may include a computer storage medium and a communication medium. The computer storage medium includes volatile and non-volatile media, and removable and non-removable media implemented by using any method or technology and configured to store information such as a computer-readable instruction, a data structure, a program module, or other data. The computer storage medium includes a RAM, a ROM, an erasable programmable ROM (EPROM), an electrically erasable programmable ROM (EEPROM), a flash memory or another solid-state memory technology, CD-ROM, a high density digital video disc (DVD) or another optical memory, a magnetic cassette, a magnetic tape, a magnetic disk memory, or another magnetic storage device. Certainly, a person skilled in the art may know that the computer storage medium is not limited to the foregoing several types. The foregoing system memory 1304 and the mass storage device 1307 may be collectively referred to as a memory.

According to the embodiments of the disclosure, the computer device 1300 may be further connected, through a network such as the Internet, to a remote computer on the network and run. That is, the computer device 1300 may be connected to a network 1312 by using a network interface unit 1311 connected to the system bus 1305, or may be connected to another type of network or a remote computer system (not shown) by using a network interface unit 1311.

The memory further includes at least one instruction, at least one program, a code set, or an instruction set. The at least one instruction, the at least one program, the code set, or the instruction set is stored in the memory and is configured to be executed by one or more processors to implement the gaze correction method for a face image, or the method for training a gaze correction model.

In some embodiments, a computer-readable storage medium is further provided. The computer-readable storage medium stores at least one instruction, at least one program, a code set, or an instruction set, and the at least one instruction, the at least one program, the code set, or the instruction set is loaded and executed by a processor of a computer device to implement the gaze correction method for a face image, or the method for training a gaze correction model provided in the foregoing embodiments.

For example, the computer-readable storage medium may include: a ROM, a RAM, a solid state drive (SSD), an optical disc, or the like. The RAM may include a resistance random access memory (ReRAM) and a dynamic random access memory (DRAM).

In some embodiments, a computer program product or a computer program is provided. The computer program product or the computer program includes computer instructions, and the computer instructions are stored in a computer-readable storage medium. A processor of a computer device reads the computer instructions from the computer-readable storage medium, and executes the computer instructions, causing the computer device to perform the gaze correction method for a face image, or the method for training a gaze correction model.

It should be understood that "plurality of" mentioned in this specification means two or more. "And/or" describes an association relationship for describing associated objects and represents that three relationships may exist. For example, A and/or B may represent the following three cases: Only A exists, both A and B exist, and only B exists. The character "/" generally indicates an "or" relationship between the associated objects. In addition, the step numbers described in this specification merely exemplarily show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of the disclosure.

The foregoing descriptions are merely exemplary embodiments of the disclosure, but are not intended to limit the disclosure. Any modification, equivalent replacement, or improvement made without departing from the spirit and principle of the disclosure shall fall within the protection scope of the disclosure.

What is claimed is:

1. A gaze correction method, performed by a first computer device, the method comprising:
   acquiring an eye image from a face image;
   determining an eye movement flow field by inputting the eye image and a target gaze direction to a gaze correction model, the target gaze direction being a gaze direction to which an eye gaze in the eye image is to be corrected;
   perform gaze correction on each pixel of the eye image based on a horizontal displacement and a vertical displacement of each pixel acquired from the eye movement flow field, to obtain a corrected eye image;
   determining an eye contour mask by performing channel dimension-based combination on the eye image and the target gaze direction, and adjusting a pixel position in the corrected eye image by applying the eye contour mask, which is obtained based on the eye movement flow field, to obtain an adjusted eye image, the eye contour mask indicating a probability that the pixel position in the eye image is in an eye region; and
   generating a face image with a corrected gaze based on the adjusted eye image.

2. The method according to claim 1, wherein the determining the eye movement flow field comprises:
   performing the channel dimension-based combination on the eye image and the target gaze direction to obtain combined data;
   performing feature extraction on the combined data by using a the gaze correction model, to obtain output data of the gaze correction model; and
   extracting the eye movement flow field from the output data.

3. The method according to claim 1, wherein the determining the eye contour mask comprises:
   performing the channel dimension-based combination on the eye image and the target gaze direction to obtain combined data;
   performing feature extraction on the combined data by using a the gaze correction model, to obtain output data of the gaze correction model; and
   extracting the eye contour mask from the output data.

4. The method according to claim 1, wherein the adjusting the pixel position in the corrected eye image comprises:
   multiplying a pixel value of the eye contour mask by a pixel value in the corrected eye image corresponding to a same position, to obtain a first intermediate image;
   multiplying a pixel value of a mapped image corresponding to the eye contour mask by a pixel value in the eye image corresponding to a same position, to obtain a second intermediate image; and
   summing pixel values in the first intermediate image and the second intermediate image corresponding to the same position, to obtain the adjusted eye image.

5. The method according to claim 1, further comprising training, by a second computer device, the gaze correction model wherein the gaze correction model is trained by:
   training a movement-flow-field-based first teacher gaze correction model by using an eye image sample, to obtain a trained first teacher gaze correction model, the trained first teacher gaze correction model being configured to output an eye movement flow field of the eye image sample, wherein a pixel position in the eye image sample is to be adjusted based on the eye movement flow field;
   training an image-based second teacher gaze correction model by using the eye image sample, to obtain a trained second teacher gaze correction model, the trained second teacher gaze correction model being configured to output a corrected eye image sample of the eye image sample; and
   performing knowledge distillation training on a student gaze correction model by using the trained first teacher gaze correction model and the trained second teacher gaze correction model, to obtain a trained student gaze correction model.

6. The method according to claim 5, wherein the training the movement-flow-field-based first teacher gaze correction model comprises:
   acquiring a training sample of the first teacher gaze correction model, the training sample comprising the eye image sample and a target corrected eye image;
   performing eye feature extraction on the eye image sample by using the first teacher gaze correction model, to obtain the eye movement flow field and an eye contour mask of the eye image sample, the eye contour mask indicating a probability that the pixel position in the eye image sample is in an eye region;
   determining a corrected eye image sample based on the eye image sample, a corresponding eye movement flow field, and a corresponding eye contour mask; and
   constructing a loss function of the first teacher gaze correction model based on the corrected eye image sample and the target corrected eye image, and adjusting a parameter of the first teacher gaze correction model based on the loss function of the first teacher gaze correction model.

7. The method according to claim 5, wherein the training the image-based second teacher gaze correction model comprises:
   acquiring a training sample of the second teacher gaze correction model, the training sample comprising the eye image sample and a target corrected eye image;
   performing gaze correction on the eye image sample by using the second teacher gaze correction model, to obtain a corrected eye image sample and an eye contour mask, the eye contour mask indicating a probability that the pixel position in the eye image sample is in an eye region;
   adjusting the corrected eye image sample based on the eye contour mask, to obtain an adjusted eye image sample; and
   constructing a loss function of the second teacher gaze correction model based on the adjusted eye image sample and the target corrected eye image, and adjusting a parameter of the second teacher gaze correction model based on the loss function of the second teacher gaze correction model.

8. The method according to claim 5, wherein the performing the knowledge distillation training comprises:
   acquiring a training sample of the student gaze correction model, the training sample comprising the eye image sample and a target corrected eye image;
   outputting a teacher eye movement flow field and a first teacher eye contour mask of the eye image sample by using the trained first teacher gaze correction model, and generating a first output image based on the eye image sample, a corresponding teacher eye movement flow field, and a corresponding first teacher eye contour mask;
   outputting a corrected image and a second teacher eye contour mask of the eye image sample by using the trained second teacher gaze correction model, and generating a second output image based on the corrected image and the second teacher eye contour mask;

outputting a student eye movement flow field and a student eye contour mask of the eye image sample by using the student gaze correction model, and generating a third output image based on the eye image sample, a corresponding student eye movement flow field, and a corresponding student eye contour mask;

constructing a loss function of the student gaze correction model based on a difference between the first output image and the third output image, a difference between the second output image and the third output image, and a difference between the third output image and the target corrected eye image; and adjusting a parameter of the student gaze correction model based on the loss function of the student gaze correction model, to obtain a the trained student gaze correction model.

9. The method according to claim 8, wherein the generating the third output image comprises:

transforming the eye image sample based on the student eye movement flow field, to obtain a transformed image; and adjusting the transformed image by using the student eye contour mask, to obtain the third output image.

10. The method according to claim 8, wherein the constructing the loss function comprises:

determining a first sub-loss based on the difference between the first output image and the third output image;

determining a second sub-loss based on the difference between the second output image and the third output image;

determining a third sub-loss based on the difference between the third output image and the target corrected eye image; and performing weighted summation on the first sub-loss, the second sub-loss, and the third sub-loss to obtain the loss function of the student gaze correction model.

11. A gaze correction apparatus, the apparatus comprising:

at least one memory configured to store program code; and at least one processor configured to read the program code and operate as instructed by the program code, the program code comprising:

eye image acquisition code configured to cause the at least one processor to acquire an eye image from a face image;

movement flow field generation code configured to cause the at least one processor to determine an eye movement flow field by inputting the eye image and a target gaze direction to a gaze correction model, the target gaze direction being a gaze direction to which an eye gaze in the eye image is to be corrected;

gaze correction code configured to cause the at least one processor to perform gaze correction on each pixel of the eye image based on a horizontal displacement and a vertical displacement of each pixel acquired from the eye movement flow field, to obtain a corrected eye image;

eye contour mask determination code configured to cause the at least one processor to determine an eye contour mask by performing channel dimension-based combination on the eye image and the target gaze direction, and adjust a pixel position in the corrected eye image by applying the eye contour mask, the eye contour mask indicating a probability that the pixel position in the eye image is in an eye region; and eye image ensembling code configured to cause the at least one processor to generate a face image with a corrected gaze based on the adjusted eye image.

12. The apparatus according to claim 11, wherein the movement flow field generation code comprises:

first performing sub-code is configured to cause the at least one processor to perform the channel dimension-based combination on the eye image and the target gaze direction to obtain combined data;

second performing sub-code is configured to cause the at least one processor to input the combined data to the gaze correction model, to obtain output data of the gaze correction model;

extraction sub-code configured to cause the at least one processor to extract the eye movement flow field and the eye contour mask from the output data.

13. The apparatus according to claim 12, wherein the gaze correction model is a student gaze correction model trained by a plurality of teacher gaze correction models, a training process of the student gaze correction model comprising:

training a movement-flow-field-based first teacher gaze correction model by using an eye image sample, to obtain a trained first teacher gaze correction model, the trained first teacher gaze correction model being configured to output an eye movement flow field of the eye image sample;

training an image-based second teacher gaze correction model by using the eye image sample, to obtain a trained second teacher gaze correction model, the second teacher gaze correction model being configured to output a corrected eye image sample of the eye image sample; and performing knowledge distillation training on the student gaze correction model by using the trained first teacher gaze correction model and the trained second teacher gaze correction model, to obtain a trained student gaze correction model.

14. The apparatus according to claim 11, wherein the eye image ensembling code is configured to cause the at least one processor to adjust the corrected eye image based on the eye contour mask by performing:

multiplying a pixel value of the eye contour mask by a pixel value in the corrected eye image corresponding to a same position, to obtain a first intermediate image;

multiplying a pixel value of a mapped image corresponding to the eye contour mask by a pixel value in the eye image corresponding to a same position, to obtain a second intermediate image; and summing pixel values in the first intermediate image and the second intermediate image corresponding to the same position, to obtain the adjusted eye image.

15. A computer device, comprising a processor and a memory, the memory storing at least one instruction, at least one program, a code set, or an instruction set, the at least one instruction, the at least one program, the code set, or the instruction set being loaded and executed by the processor to perform the gaze correction method according to claim 1.

16. A computer device, comprising a processor and a memory, the memory storing at least one instruction, at least one program, a code set, or an instruction set, the at least one instruction, the at least one program, the code set, or the instruction set being loaded and executed by the processor to perform the method for training the gaze correction model according to claim 5.

17. A non-transitory computer-readable storage medium, storing at least one instruction, at least one program, a code set, or an instruction set, and the at least one instruction, the at least one program, the code set, or the instruction set being loaded and executed by a processor to perform the gaze correction method according to claim 1.

18. A non-transitory computer-readable storage medium, storing at least one instruction, at least one program, a code set, or an instruction set, and the at least one instruction, the at least one program, the code set, or the instruction set being loaded and executed by a processor to perform the method for training the gaze correction model according to claim 5.

* * * * *